Jan. 21, 1936. J. F. FRESE 2,028,734
TRAIN LIGHTING SYSTEM
Filed Oct. 7, 1935
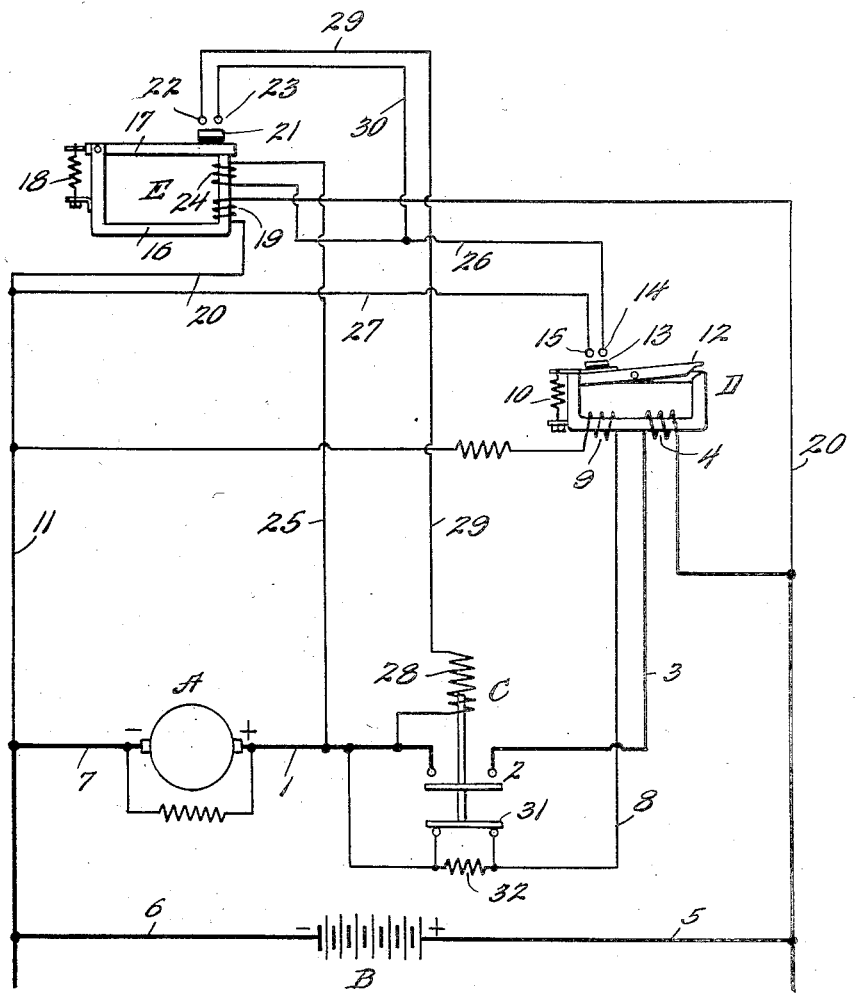
Joseph F. Frese Inventor
By Robert Walton Attorney Patented Jan. 21, 1936

2,028,734

UNITED STATES PATENT OFFICE 2,028,734

TRAIN LIGHTING SYSTEM

Joseph F. Frese, Baltimore, Md., assignor to Monitor Controller Company, Baltimore, Md., a corporation of Maryland Application October 7, 1935, Serial No. 43,983

3 Claims. (Cl. 171—313)

This invention relates to a system for charging storage batteries from variable speed generators, such as are driven from car axles. Suitable field controlling devices are used with such generators to limit the maximum voltage to a predetermined value suitable for charging the battery and supplying current to translating devices on the load circuit, as is well known. Within that limit, the generator voltage varies with the speed of the generator, while the battery voltage will be high when the battery is fully charged and low when the battery is run down.

A contactor and controlling devices therefor are usually provided for automatically connecting the generator to the storage battery when the voltage of the generator reaches a predetermined value, and in my Patent No. 1,973,804, dated September 18, 1934, I have shown a reverse current relay operable to close the contactor circuit when the generator voltage reaches a predetermined value.

In the present invention the reverse current relay of the aforesaid patent is used to control the contactor in conjunction with a relay having a coil constantly energized by current from the battery and normally preventing closure of the circuit of the contactor, and having also a coil adapted to be connected to the generator by the reverse current relay, and, when so connected, adapted to neutralize the magnetizing effect of the battery-connected coil when and if the voltage of the generator is above that of the battery, but not otherwise. When the effect of the battery coil is overcome by the generator coil, the contactor circuit is closed and the contactor connects the generator to the battery. Thus, the contactor cannot close the charging circuit except when the generator voltage is above the battery voltage.

In the accompanying drawing which illustrates the invention diagrammatically, A indicates a direct current generator operable at varying speeds, as when driven from a car axle, and B indicates a battery which is kept charged by the generator. The charging circuit from the generator to the battery, indicated in heavy lines, extends from the positive pole of the generator by conductor 1 through normally open switch 2 of contactor C, thence by conductor 3 through coil 4 of reverse current relay D to conductor 5 which leads to the positive side of the battery. Conductors 6 and 7 connect the negative side of the battery to the negative pole of the generator. When the contactor C is closed, it connects the generator with the battery.

The reverse current relay D is the same as that shown in my patent before mentioned, wherein it is shown directly controlling the circuit of the contactor switch which closes the charging circuit, whereas in the present invention, it controls the contactor in conjunction with an interlock relay E. The relay D has an energizing coil 9 permanently connected across the terminals of the generator, the circuit for this coil extending from the generator through conductors 1 and 8 to coil 9, and thence by conductors 11 and 7 back to the generator. The armature 12 of relay D carries a contact piece 13 adapted to bridge stationary contacts 14 and 15 when the relay is energized by the coil 9, but the armature is normally held in open position by an adjustable spring 10, with the contact 13 out of engagement with the stationary contacts.

The relay E comprises a core 16 of any suitable form, shown as of U-shape, with an armature 17 pivoted to one pole piece and spring-pressed away from the opposite pole piece by an adjustable spring 18. The relay has a coil 19 permanently connected to the battery through conductors 5, 20, 11 and 6 and the current flowing in this coil normally energizes the magnet sufficiently to hold the armature against the pole pieces of the magnet, thus holding an insulated contact 21 on the armature away from stationary contacts 22 and 23. The magnet also has a coil 24 which is adapted to be connected to the generator terminals by the reverse current relay D, and this coil is wound so as to oppose the coil 19. The circuit for the coil 24 is from the positive side of the generator through conductors 1 and 25 to the coil, thence by conductor 26 to switch contacts 14, 13, and 15 of relay D and thence by conductors 27, 11 and 7 to the generator. When the switch of relay D closes, the coil 24 of relay E is connected to the generator, and under certain conditions of operation this coil neutralizes the effect of the permanently energized battery coil 16, and then the spring 18 moves the armature 17 to switch closing position. When this occurs the coil 28 of contactor C is energized through a circuit which extends from the generator through conductor 1 to said coil, thence by conductor 29 to contacts 22, 21, and 23 of relay E, thence by conductors 30 and 26 to contacts 14, 13, and 15 of relay D and thence by conductors 27, 11, and 7 to the generator. When the contactor coil 28 is energized, the switch 2 closes and connects the generator to the battery. At the same time the contactor lifts a switch member 31 which opens a shunt about a resistance 32 in series with the energizing coil 9 of relay D, to cut down the current flowing through said coil, this feature being disclosed in my aforesaid patent.

When the generator is stopped, the movable members of the relays and contactor are in the positions shown, the switch of relay E being held open magnetically by current flowing in the coil 19 which is permanently connected to the battery terminals. When the generator starts and after its speed has increased so that its voltage has a predetermined value, suitable for normal charging of the battery, the current flowing in the energizing coil 9 of reverse current relay D causes this relay to close and thereby connect the coil 24 of the interlock relay E to the generator terminals. This coil 24, which may be termed the generator coil, is wound so as to oppose the battery coil 19. If the generator voltage is less than the battery voltage, the generator coil will not neutralize the magnetizing effect of the battery coil 19, and the armature of the interlock relay will not be released, and hence the circuit of the contactor C will not be closed and the contactor will not connect the generator to the battery; but if and when the generator voltage rises above the battery voltage, whatever that may be, the current in the coil 24 of the interlock relay will neutralize the magnetizing effect of the battery coil, and the spring 18 will rock the armature 17 to connect the contacts 21, 22, and 23, and thus complete the circuit to the coil 28 of the contactor C. The contactor will then close, connecting the generator to the battery. The reverse current relay D controls the circuit of the generator coil of the relay E, and if the generator speed slows down until the voltage of the generator is less than that of the battery, current will flow from the battery to the generator through the coil 4 of relay D, weakening the magnetizing effect of the coil 9, and the relay armature will be moved by the spring 14 to open the circuit of the generator coil 24 on the interlock relay and at the same time open the circuit of the contactor magnet. The permanently energized battery coil 16 will then prevail and the armature 17 will be moved to the position shown in the drawing, opening the circuit to the coil of the contactor C. The contactor will immediately open the circuit connection between the generator and the battery. It will be seen from this that the coils of the relay E are balanced against one another when the generator coil is connected to the generator so that if the generator voltage is less than the battery voltage, the generator coil will not neutralize the effect of the battery coil and the relay will not close the contactor circuit; but when the generator voltage increases to a predetermined value above the battery voltage, the generator coil will neutralize the effect of the battery coil and the spring 18 will move the armature 17 to close the circuit of the contactor coil and the contactor will operate to connect the battery to the generator.

What I claim is:

1. In a train lighting system, a storage battery, a variable speed generator for charging the battery, a charging circuit including a normally open contactor, a normally open circuit for connecting the magnet of said contactor to the generator and means controlling said latter circuit to close the same only when the generator voltage is above the battery voltage comprising a relay having a coil constantly energized by current from the battery and having a switch biased to closed position but normally held in open position by the magnetizing effect of said coil and having also a coil adapted to be connected to the generator and to neutralize the magnetizing effect of the battery coil when the generator voltage is above the battery voltage, thereby to permit said switch to close, and a relay responsive to generator voltage adapted to connect said generator coil to the generator at a predetermined generator voltage.

2. In a train lighting system, a storage battery, a variable speed generator for charging the battery, a charging circuit including a normally open contactor, a normally open circuit for connecting the magnet of said contactor to the generator and means controlling said latter circuit to close the same only when the generator voltage is above the battery voltage comprising a relay having a coil constantly energized by current from the battery and having a switch biased to closed position but normally held in open position by the magnetizing effect of said coil and having also a coil adapted to be connected to the generator and to neutralize the magnetizing effect of the battery coil when the generator voltage is above the battery voltage, thereby to permit said switch to close, and a reverse current relay responsive to generator voltage adapted to connect said generator coil to the generator at a predetermined generator voltage.

3. In a train lighting system, a storage battery, a variable speed generator for charging the battery, a charging circuit including a normally open contactor, a normally open circuit for connecting the magnet of said contactor to the generator and means controlling said latter circuit to close the same only when the generator voltage is above the battery voltage comprising a relay having a coil constantly energized by current from the battery and having a switch biased to closed position but normally held in open position by the magnetizing effect of said coil and having also a coil adapted to be connected to the generator and to neutralize the magnetizing effect of the battery coil when the generator voltage is above the battery voltage, thereby to permit said switch to close, and a relay responsive to generator voltage adapted to connect said generator coil to the generator at a predetermined generator voltage and also to connect one side of the contactor magnet circuit to the generator.

JOSEPH F. FRESE.